United States Patent
Mortimer et al.

(10) Patent No.: US 10,414,676 B2
(45) Date of Patent: Sep. 17, 2019

(54) METHOD AND SYSTEM FOR PROVIDING PURIFIED WATER

(71) Applicant: VWS (UK) LTD, Buckinghamshire (GB)

(72) Inventors: Alan Denton Mortimer, Oxfordshire (GB); Lee Underwood, Buckinghamshire (GB); John Andrew Walker, Berkshire (GB)

(73) Assignee: VWS (UK) LTD., High Wycombe, Buckinghamshire (GB)

( * ) Notice: Subject to any disclaimer, the term of this patent is extended or adjusted under 35 U.S.C. 154(b) by 332 days.

(21) Appl. No.: 14/402,063

(22) PCT Filed: Jun. 7, 2013

(86) PCT No.: PCT/GB2013/051503
§ 371 (c)(1),
(2) Date: Nov. 18, 2014

(87) PCT Pub. No.: WO2013/186538
PCT Pub. Date: Dec. 19, 2013

(65) Prior Publication Data
US 2015/0151992 A1    Jun. 4, 2015

(30) Foreign Application Priority Data

Jun. 13, 2012 (GB) .................................. 1210456.8

(51) Int. Cl.
*C02F 1/72* (2006.01)
*C02F 1/00* (2006.01)
*C02F 103/04* (2006.01)

(52) U.S. Cl.
CPC .............. *C02F 1/72* (2013.01); *C02F 1/006* (2013.01); *C02F 1/008* (2013.01);
(Continued)

(58) Field of Classification Search
CPC combination set(s) only.
See application file for complete search history.

(56) References Cited

U.S. PATENT DOCUMENTS 2,195,981 A * 4/1940 Conant ...................... C02F 1/78
                                                        210/220
4,842,723 A * 6/1989 Parks ......................... C02F 1/78
                                                        210/192
(Continued)

FOREIGN PATENT DOCUMENTS

| EP | 2008974 A1 | 12/2008 |
|---|---|---|
| JP | 07096273 A | 4/1995 |
| JP | 2003275743 A | 9/2003 |

OTHER PUBLICATIONS

UK IPO, Combined Search and Examination Report for GB1310135.7, dated Jun. 13, 2014, 5 pages.
(Continued)

*Primary Examiner* — Bobby Ramdhanie
*Assistant Examiner* — Michael J An
(74) *Attorney, Agent, or Firm* — Drinker Biddle & Reath LLP

(57) ABSTRACT

A method of providing at least two outlet purified water streams from a water purification system by providing a first purified water into a first reservoir able to provide an outlet purified water stream. At least a portion of the first purified water is passed from the first reservoir through a water purification process to provide an ultra-purified water stream. The ultra-purified water stream is passed to a second reservoir. An excess of ultra-purified water is provided into the second reservoir beyond a pre-determined quantity, The excess ultra-purified water in the second reservoir is allowed to flow from the second reservoir into the first reservoir. An
(Continued)

outlet from the water purification system of an ultra-purified water stream is provided from the second reservoir.

23 Claims, 3 Drawing Sheets

(52) U.S. Cl.
CPC ...... *C02F 2103/04* (2013.01); *C02F 2209/05* (2013.01); *C02F 2301/046* (2013.01); *C02F 2303/04* (2013.01)

(56) References Cited

U.S. PATENT DOCUMENTS

| | | | |
|---|---|---|---|
| 5,302,298 A * | 4/1994 | Leitzke | A61L 2/10 210/188 |
| 5,415,221 A * | 5/1995 | Zakryk | E04H 4/129 165/108 |
| 5,720,869 A | 2/1998 | Yamanaka et al. | |
| 5,817,231 A * | 10/1998 | Souza | B01D 61/08 210/104 |
| 6,579,445 B2 * | 6/2003 | Nachtman | C02F 9/005 210/136 |
| 6,627,053 B2 * | 9/2003 | Hirota | C02F 1/46104 204/228.1 |
| 2009/0319194 A1 * | 12/2009 | Rajagopalan | G01N 27/06 702/23 |
| 2012/0055556 A1 | 3/2012 | Tokoshima et al. | |

OTHER PUBLICATIONS

International Search Report for PCT/GB2013/051503, dated Aug. 1, 2014, 2 pages.

Light et al., The Conductivity of Low Concentrations of Co2 Dissolved in Ultrapure Water From 0-100C, dated Apr. 2-6, 1995, 18 pages.

* cited by examiner

METHOD AND SYSTEM FOR PROVIDING PURIFIED WATER

FIELD OF THE INVENTION

The present invention relates to a method of providing purified water, in particular at least two outlet purified water streams from a water purification system, and to a water purification system to provide the method, particularly but not exclusively for laboratory water.

BACKGROUND

Water purification apparatus and units for use in laboratories and healthcare facilities are well known. Generally, they involve the reduction and/or removal of contaminants and impurities to very low levels. They typically contain a variety of technologies that remove particles, colloids, bacteria, ionic species and organic substances and/or molecules.

Many analytical laboratories now require a purified stream of 'ultra-pure' or 'ultra-purified' water, which can be considered as purified water having a resistivity of >10MΩ·cm (herein all at 25° C.), preferably >15MΩ·cm or higher. This is of particular importance where such laboratories are involved in research requiring the highest possible purity. Advanced analytical techniques or processes requiring the highest possible purity of water include ion chromatography, high performance liquid chromatography, ICP/mass spectroscopy, etc. Analysers in laboratories, typically medical laboratories, are often automated to carry out a sequence of analyses on samples such as blood or urine. Again these analysers require an immediately available quantity of highly purified feedwater, typically ultra-pure water.

Typically in such analytical techniques or processes, only relatively small volumes of such ultra-pure water are required. Meanwhile, greater volumes of water are required for more general duties in the same location, generally in laboratories, such as rinsing of glassware and containers, and the preparation of bulk reagents from concentrated standards, etc. However, the water purity or quality for such purposes, whilst still needing some degree of purification compared with general water sources, need not be of the highest possible purity or of an 'ultra-pure' standard.

To provide both ultra-pure water and more general purified water, two separate water purification systems or supplies, each dedicated to providing the appropriate quality for the specific application, could be provided, but with attendant cost. Alternatively, a single water purification unit could be provided to provide all the purified water, but it must operate at the highest quality for the analytical techniques, making it expensive to operate for the larger volumes of more general purified water.

Another requirement of analytical techniques and processes is that although only low volumes are required, such low volumes must be available at all times irrespective of any other supply requirements from the water purification unit or system. However, all water quality deteriorates over time, generally through any period of being static or stationary such as in a reservoir, and this problem is greater or more acute the higher the water purity.

Analysers typically require water in a cyclical manner and at a relatively high flow-rate, but only for short periods, thus giving a known volume requirement and delivery schedule.

SUMMARY OF THE INVENTION

It is an object of the present invention to provide a simple and more cost-effective method of providing a highest purity water stream suitable for an analyser, and a more general purified water stream for other purposes, from a single water purification system.

Thus, according to one aspect of the present invention, there is provided a method of providing at least two outlet purified water streams from a water purification system comprising at least the steps of:
(a) providing a first purified water into a first reservoir able to provide an outlet purified water stream;
(b) passing at least a portion of the first purified water from the first reservoir through a water purification process to provide an ultra-purified water stream;
(c) passing the ultra-purified water stream to a second reservoir;
(d) providing an excess of ultra-purified water into the second reservoir beyond a pre-determined quantity;
(e) allowing the excess ultra-purified water in the second reservoir to flow from the second reservoir into the first reservoir; and
(f) providing an outlet from the water purification system of an ultra-purified water stream from the second reservoir.

In this way, the water purification system has a second reservoir which provides a buffer volume of ultra-purified water immediately available for output through a dedicated line for high purity purposes such as analyser feed, and also a first reservoir of purified water for other less high quality purposes, available as a separate outlet stream. Excess ultra-purified water in the second reservoir, that is the volume or amount of ultra-purified water being generated by the water purification process and passing into the second reservoir but being beyond a pre-determined quantity that is desired to be available from the second reservoir, is simply returned to the first reservoir.

Preferably, the first reservoir is bigger than the second reservoir. The pre-determined maximum quantities contained within the first and second reservoirs, whether this is their capacity, size or volume, and their relative scale, are not limiting on the present invention. The first reservoir could have a maximum desired volume of less than 1 liter, more typically at least 2 or 5 or 10 liters, optionally more. The second reservoir could have a maximum desired volume being greater than or less than 1 liter, optionally in the range 0.2-5 liters. The relative maximum pre-determined quantities of water desired to be held in the first and second reservoirs may in the range of ratios 2:1 to 10:1, or even >10:1.

The capacity of the second reservoir is such that it is large enough to provide the requirements, in terms of volume, of for example a laboratory analyser in each short period that the analyser requires water. If more than one analyser is to be supplied by the water purification system then the capacity of the second reservoir should be sized to the sum of the requirements of the analysers to be fed.

The volume or capacity of the second reservoir that is pre-determined to define an 'excess' of ultra-purified water in the second reservoir may be a part or portion of the second reservoir, and may or may not equate to the overall volume of the second reservoir. Where the pre-determined quantity in the second reservoir is defined by the volume or capacity of a part of the second reservoir, the second reservoir may not require a dedicated level control, in particular an intrusive level control, to recognise the excess definition. Not having such a level control reduces complexity, and may also reduce or minimise bacterial or other contamination by reducing undesired extra surface area within the second reservoir.

There may be a passageway, path or guideway or passage for such excess ultra-purified water at or near an upper part or portion of the second reservoir back to the reservoir.

The water purification process is intended to provide an outlet ultra-purified water stream having a conductivity of less than 1 μS/cm, preferably less than 0.1 μS/cm, and more preferably less than 0.067 μS/cm. This can be equated to an ultra-purified water stream having a resistivity of at least 1 MΩ·cm, preferably at least 10 MΩ·cm, more preferably at least 15 MΩ·cm. Other parameters may be of importance in the analyser feedwater such as having a total organic carbon (TOC) of less than 500 ppb, potentially <5 ppb, or having a bacterial contamination of less than 100 cfu/ml, potentially <1 cfu/ml. The quality of the initial feedwater entering the water purification system, and the quality requirements of the analyser feed, will determine the technologies incorporated in the water purification process between the first and second reservoirs.

Preferably, the outlet ultra-purified water stream is an ultra-purified analyser water stream: that is, having a purity for use in analytic instruments, techniques, processes, etc. such as various forms of chromatography and spectroscopy.

According to one embodiment of the present invention, step (b) is wholly or substantially continuous. Preferably, step (b) is continuous during periods when ultra-purified water is desired to be available from the second reservoir to the analyser and/or it is desired to maintain high purity in the second reservoir and/or it is desired to improve the quality of the water in the first reservoir. Thus, as well as being able to provide the desired ultra-purified water, the present invention is also able to assist in maintaining water purity in the second reservoir and improving water purity in the first reservoir. Such active use may be during laboratory 'operating hours', and as long as there is enough water in the first reservoir. When the level in the first reservoir is too low, as indicated for example by a level control, then a pump could be turned off to prevent wear on the pump.

When the method of the present invention is not continuously or regularly required, for example during non operational hours of a laboratory, the water purification system would typically only cycle water from the first reservoir to the second reservoir intermittently, say 5 minutes per hour. This would maintain a high level of purity in the second reservoir while reducing wear on any electrical components such as the pump motor or oxidisers such as ultraviolet light tubes, and hence increase their life.

The water purification process providing the ultra-purified water stream usually includes one or more pumps, and usually at least one pump is operating continuously. In this way, by the continuous passage of at least a portion of the first purified water through the water purification process, there is continuously provided an ultra-purified water stream having the highest achievable water purification quality, which is therefore continuously available in the second reservoir.

The water purification process providing the ultra-purified water stream may comprise any number of devices, parts, components, lines, etc, including but not limited to one or more of the following: pumps, meters, sensors, oxidisers, de-ionisers, purification packs, activated carbon, valves, drains, control units and mechanisms, taps, filters, membranes. Preferably, the water purification process comprises at least a pump, and a purification pack comprising ion exchange resin.

Preferably, the water purification process of step (b) includes oxidation of the water.

One common oxidiser involves the use of ultraviolet light, and the short wavelength ultraviolet treatment of water for decomposing organic compounds or substances in water is well known in the art. Generally, ultraviolet light is able to decompose many organic compounds and substances that are contained or are residues in generally available water, by oxidising them to form ionic or charged species which can then be removed by ion exchange resin or the like. The ultraviolet light may additionally or alternatively be used to kill micro-organisms, thus disinfecting the water. Bacterial breakdown particles may be removed by passage of the water through ultra-filters, ultra-microfilters or activated carbon as known in the art.

Apparatus and instruments for providing suitable ultraviolet light are well known in the art, and typically involve emitting ultraviolet light at one or more specific wavelengths, such as at 254 and/or 185 nanometers, in an area or space through which the water passes.

In many water purification units or apparatus, oxidisers are provided as a distinct component, typically a separable component such as a replaceable cartridge, having an ultraviolet emitter therein close to which the water stream passes from an inlet to an outlet. The purification of water in the present invention may involve one or more oxidisers, being in series, parallel or both.

The dispense of the outlet purified water stream and the outlet ultra-purified water stream can be provided through any form or type of outlet or outlets, optionally being co-ordinated or separate.

The excess ultra-purified water in the second reservoir may flow from the second reservoir into the first reservoir along or though any suitable path or pathway.

Optionally, the excess ultra-purified water in the second reservoir overflows from the second reservoir into the first reservoir. That is, the excess ultra-purified water in the second reservoir flows over from or through a part of the second reservoir above or beyond the pre-determined capacity. Such part could be a lip, aperture or a plurality of same.

Optionally, the second reservoir is within the first reservoir. In this way, any overflow from the second reservoir passes automatically into the first reservoir.

Alternatively, the second reservoir is adjacent the first reservoir, such that any overflow in the second reservoir passes into the neighbouring first reservoir.

Optionally, the excess ultra-purified water that overflows from the second reservoir is guided or otherwise directed to pass directly into the first reservoir. In one arrangement, the overflow from the second reservoir passes over or through a wall of the second reservoir, via a hole or series of holes or perforations or the like, and into the first reservoir. The wall is particularly adapted to allow for, and more particularly guide, the overflow in the second reservoir to pass directly into the first reservoir.

The addition of ultra-purified water in the second reservoir passing into the first reservoir will also inherently increase the quality of water in the first reservoir, depending upon the amount of overflow. This therefore improves the quality of the first purified water in the first reservoir, especially if the water purification process providing the ultra-purified water stream is operating continuously. This then reduces the loading of contaminants entering the water purification process leading to the second reservoir, resulting in reducing further demand on the capacity of the processes in the water purification process.

Optionally, the first purified water for step (a) is provided by a pre-purification process. The first purified water may be provided by the reduction and/or removal of any or one or more of the contaminants and impurities in a feed or supply water stream. This can involve the reduction and/or removal of one or more of the following: particles, colloids, bacteria, biochemical, micro-organisms, ionic species, and organic substances.

The pre-purification process preferably comprises at least de-ionising of a supply water stream. A supply water stream may comprise any source of water, generally being a potable water source, generally available to a user from a main supply or other continuous or large supply, which may have been at least prior partially purified. Commonly, such a water source is provided from a tap or other standard supply device, having a line or other connection with the pre-purification process.

The pre-purification process may comprise any number of devices, parts, components, lines, etc, including but not limited to one or more of the following: pumps, meters, sensors, oxidisers, de-ionisers, valves, drains, control units and mechanisms, taps, filters, membranes.

Many types and forms of de-ionisers are known in the art, and include, but are not limited to, one or more of the following; (electro)deionisation apparatus or units, reverse osmosis (RO) units or apparatus, ion-exchangers, resins and zeolites. The action and operation of a de-ioniser is well known in the art, and they are not further described in detail herein.

Optionally, the first purified water is provided by reverse osmosis and has a conductivity of <50 μS/cm, such as 5-50 μS/cm. Optionally the water is further purified so that it has a resistivity of >1MΩ·cm.

According to a second aspect of the present invention, there is provided a water purification system able to provide at least two outlet purified water streams comprising at least:
(a) a first reservoir having a first purified water inlet, and able to provide an outlet purified water stream;
(b) one or more connected water purification process units able to provide an excess of an ultra-purified water stream to a second reservoir from water provided from the first reservoir;
(c) the second reservoir having a pre-determined capacity for the ultra-purified water provided by step (b), and able to provide an outlet ultra-purified water stream from the system; and
(d) a direct pathway from the second reservoir to the first reservoir to allow the excess ultra-purified water provided into the second reservoir beyond the pre-determined capacity to flow from the second reservoir into the first reservoir.

Preferably, the water purification process unit(s) includes one or more of the following group comprising: an oxidiser, a pump, activated carbon, a deioniser. Such items are discussed in more detail hereinbefore.

Preferably, the first reservoir is bigger than the second reservoir, optionally as described hereinbefore.

Optionally, the second reservoir is within the first reservoir.

Alternatively, the second reservoir is adjacent the first reservoir.

In one embodiment, the direct pathway between the second reservoir and the first reservoir is a wall of the second reservoir.

Preferably, the water purification unit operates continuously, and the ultra-purified water stream has a resistivity of >10MΩ·cm, more preferably >15 MΩ·cm.

Optionally, the first purified water for step (a) is provided by a pre-purification unit, which may be part of the water purification system. The first purified water may be provided by the reduction and/or removal of any or one or more of the contaminants and impurities in a feed or supply water stream as discussed hereinbefore.

Optionally, the pre-determined capacity in the second reservoir of the system is defined by the volume of a part of the second reservoir. In this way, the second reservoir may not include a level sensor, i.e. it can operate independent of any electronic or electro-mechanical control.

The water purification system of the present invention, and optionally any pre-purification unit, may be part of a larger water purification apparatus which at least comprises: a water inlet, a pump, an oxidiser, a de-ioniser such as an ion-exchanger, and at least two water outlets. Such water purification apparatus may provide up to 1000 liters of purified water per hour, such as up to 5 l/min.

Such water purification apparatus are generally 'stand alone' units, generally only requiring connection to nearby water and electricity supplies to be operable. Thus, they are generally independent and/or movable units operating in or at a specific location such as a laboratory.

Preferably, at least the majority of the purification actions or processes required in the present invention occur within a housing. They are intended to provide a purified water streams only, such streams not being in combination with any other substance or compound.

The skilled man is aware of the relationship between conductivity and resistivity, such that either one or both measurements can be made by a suitable measurer or meter. Thus, the term "conductivity value" as used herein relates to the measurement of the conductivity and/or resistivity of a water stream. The skilled man is also aware that conductivity and/or resistivity measurements or values are temperature dependent. Commonly, a temperature of 25° C. is used as a standard temperature when discussing and comparing conductivity and/or resistivity measurements, such that the conductivity of "pure" water is considered to be 0.055 μS/cm and the resistivity is considered to be 18.2 MΩ·cm, at 25° C.

BRIEF DESCRIPTION OF THE DRAWINGS

Embodiments of the present invention will now be described by way of example only and with reference to the accompanying drawings in which.

DESCRIPTION OF THE PREFERRED EMBODIMENTS

Figure 1:
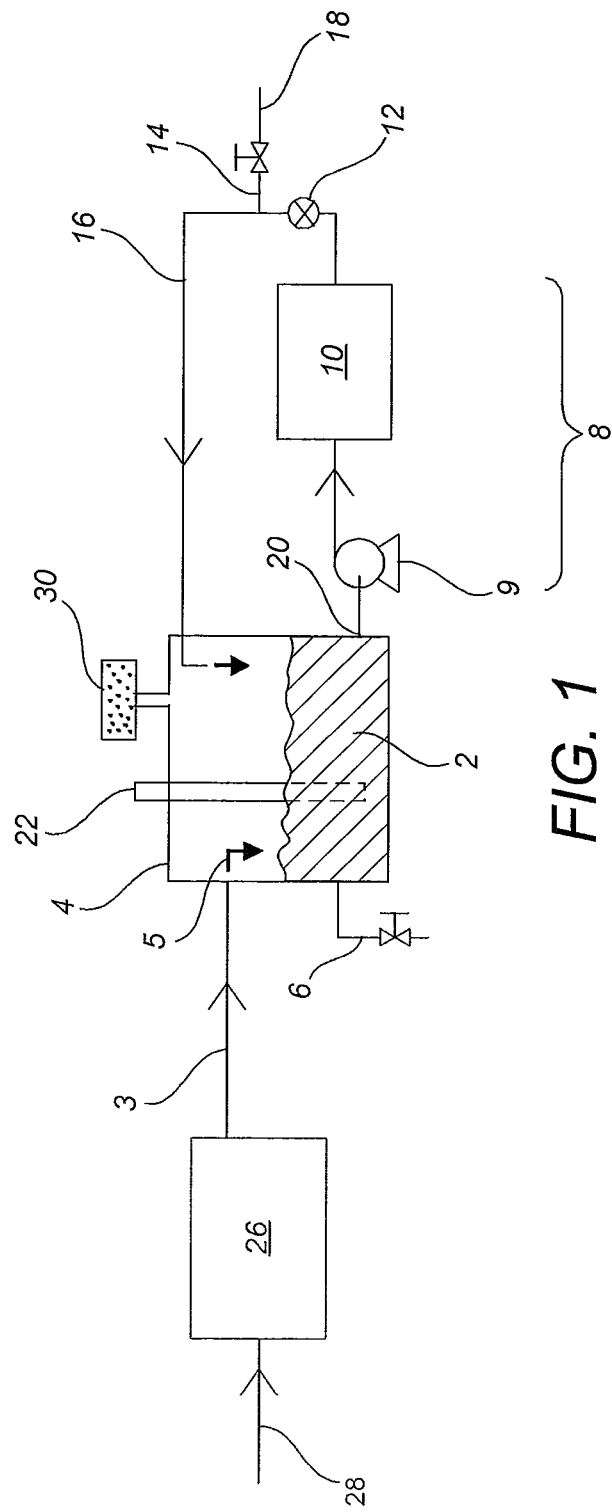
FIG. 1 is a schematic view of a prior art system that provides two outlet purified water streams.

Referring to the drawings, FIG. 1 shows a prior art system wherein two outlet streams are provided by one water purification system.

FIG. 1 shows a first reservoir 4 containing purified water 2 with an outlet for a purified water stream 6. The form and nature of this outlet from the first reservoir 4 may involve one or more 'point of use' outlets, and one or more sensors in order to determine the parameters of the outlet purified water stream, such as its purity, temperature, etc. The outlet may include a pump to provide water to a distant location or at an elevated pressure.

The purified water 2 is provided by feed water 5 can be provided from a pre-purification process or unit 26 having a general water supply 28, along a feed line 3.

The feed water 5 has a conductivity<50 μS/cm. The feed water 5 passes into the first reservoir 4, and is controlled by valving and/or pumps in or upstream of the feed line 3 determined by a level control 22 in the reservoir. Level controls may be electronic of mechanical.

At least a portion of the purified water 2 from the first reservoir 4 passes to a connected water purification unit 8 through another outlet 20 of the first reservoir 4. The water purification unit 8 comprises a pump 9, one or more water purification process unit(s) 10, and one or more water purity sensors 12.

The pump 9 provides the purified water 2 from the first reservoir 4 through the water purification process unit(s) 10 and sensors 12 and back to the first reservoir 4. A take off point 14 before the return to the reservoir allows ultra-purified water 16 created by the units(s) 10 to be passed to an analyser as an outlet stream 18.

The water purification process unit(s) 10 may comprise one or more oxidisers, deioniser or filters. Oxidisers may have one or more UV lamps therein, generally having a wave length of 185/254 nm in a manner known in the art. The oxidisers are able to decompose organic compounds or substances in the water by oxidising them to form ionic or charged substances. These, along with ions that were present in the purified water 2, can be removed by a deioniser. Deionisers may be ion exchange materials such as ion exchange resin or electrodeionisation units. The water purification process unit(s) 10 thereby provides an ultra-purified water stream 16, whose purity can be measured by the one or more sensors 12 prior to passing back into the first reservoir 4.

When the water level in the first reservoir drops to a low level as indicated by the level control 22, such as by a significant volume of water taken from outlet 6, then the pump 9 is shut off until further feed water 5 fills the reservoir 4. However, during this period there is no ultra-purified water available to an analyser via outlet 18.

Figure 2:
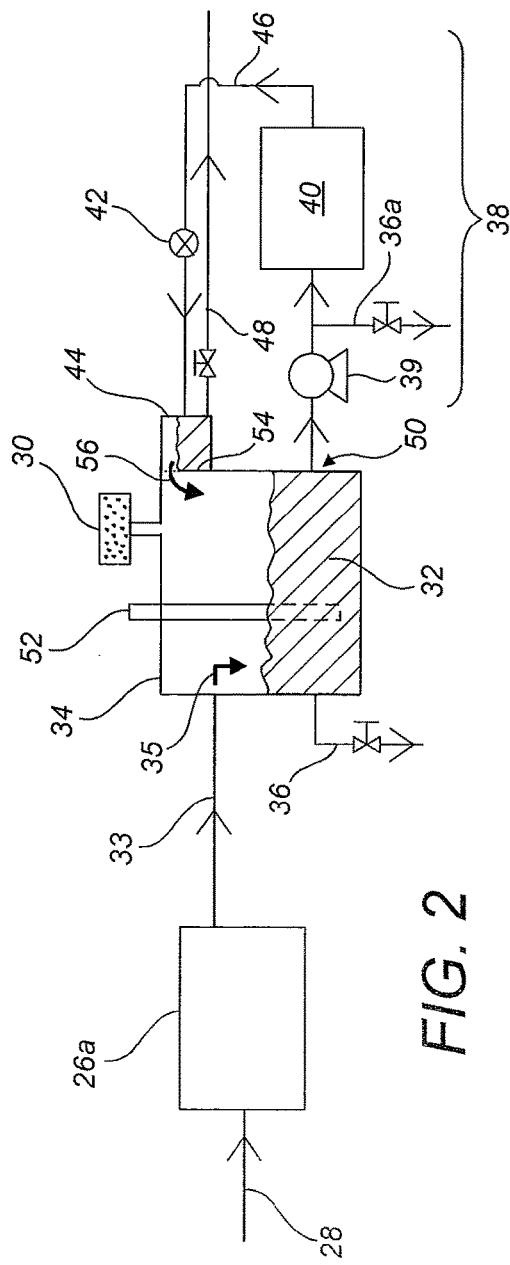
FIG. 2 is a schematic view of a method and system of providing at least two outlet purified water streams according to one embodiment of the present invention.

FIG. 2 shows a first method according to one embodiment of the present invention for providing at least two outlet purifying water streams from a first water purifying system, said system being another embodiment of the present invention.

FIG. 2 shows a first reservoir 34 containing purified water 32, with an outlet for a purified water stream 36. The form and nature of the outlet from the first reservoir 34 able to provide the outlet purified water stream 36 may involve one or more point of use outlets, and one or more sensors in order to determine the parameters of the outlet purified water stream, such as its purity, temperature, etc. The outlet may include a pump to provide water to a distant location or at elevated pressure.

A feed line 33 provides a feed water 35 into the first reservoir 34, having a conductivity<50 μS/cm. It is controlled by valving and/or pumps in or upstream of the feed line 33 as required by a level control 52 in the first reservoir 34.

At least a portion of the purified water 32 from the first reservoir 34 passes to a connected water purification unit 38 through another outlet 50 of the first reservoir 34. The water purification unit 38 comprises a pump 39, one or more water purification process unit(s) 40, and one or more water purity sensors 42.

The pump 39 provides the purified water 32 from the first reservoir 34 through the water purification process unit(s) 40 and sensors 42 and into a second reservoir 44. The pump 39 may run continuously, or at least run sufficiently that the volume of purified water 32 provided to the water purification unit 38 is greater than a predetermined volume of the second reservoir 44 during non-requirement of water from the second reservoir 44 as discussed hereinafter.

The pump 39 may also be used to provide the pressure required for output of purified water 32 from the system by means of a take off point 36a after the pump 39 but before the water purification process unit(s) 40, and/or for any additional ultra-purified water take off point (not shown) after the water purification process unit(s) 40.

The water purification process unit(s) 40 may comprise one or more oxidisers, deioniser or filters as discussed hereinbefore. The water purification process unit(s) 40 thereby provides an ultra-purified water stream 46, whose purity can be measured by the one or more sensors 42 prior to passing into the second reservoir 44.

The second reservoir 44 provides an outlet ultra-purified water stream 48 through a suitable outlet, having the highest possible purity, and ready for use by one or more analysers, and/or by one or more analytical techniques or processers such as those described hereinbefore. This may require a pump (not shown) dependant upon the feedwater pressure requirements and the location of the analyser.

Preferably, the ultra-purified water stream 46, and hence the outlet ultra-purified water stream 48, has a resistivity of >15 MΩ·cm, more preferably >18 MΩ·cm, such as 18.2 MΩ·cm. Preferably, these streams 46, 48 also have a typical TOC of <5 ppb.

FIG. 2 shows the second reservoir 44 being adjacent to the first reservoir 34. FIG. 2 shows the first and second reservoirs 34, 44 having a shared wall 54, which wall 54 may be a common wall, or an abutting wall of each of the first and second reservoirs 34, 44.

FIG. 2 shows the excess ultra-purified water being an overflow 56 from the second reservoir 44 falling into the first reservoir 34. The overflow 56 may pass over the shared wall 54, which may be perforated or deliberately lower than other walls of the first and/or second reservoirs 34, 44. Alternatively, there are one or more other guides or passages between the first and second reservoirs 34, 44 such that the excess ultra purified water passing into the second reservoir 44 can pass directly into the first reservoir 34.

FIG. 2 shows the second reservoir 44 being smaller than the first reservoir 34. Generally, the highest purity water of the water purification system, being for analysers or analytical techniques, is usually of a smaller required volume than lower quality, but still purified, water, that is desired for other purposes such as rinsing glassware/containers, etc. as described hereinbefore. However, the water purification method and system of the present invention are able to make available a volume of ultra-purified water from the second reservoir 44 at all times, irrespective of other outlet requirements from the first reservoir 34.

Thus, the present invention provides a number of further advantages.

Firstly, it is generally desired to hold the highest purity water, such as the ultra-purified water stream 48, in a reservoir or chamber that is constructed from very high purity inert material to minimise any re-contamination of the water by the materials of construction of the reservoir.

However, such inert materials are expensive, and generally too expensive to consider using them to form more general or larger reservoirs, such as the first reservoir 34. The present invention allows the economic creation of the second reservoir 44 from very high purity inert materials, whilst still allowing the first reservoir 34 to be formed from less-expensive materials. The design of the reservoir may also be such that it minimises areas of potential bacterial growth through material selection or limiting surface area or additional components such as level controls. The second reservoir may additionally include means to irradiate the water with UV light to further minimise bacterial re-contamination.

In this regard, where the pre-determined quantity in the second reservoir is defined by the volume or capacity of a part of the second reservoir, the second reservoir may not require and can operate independent of a dedicated level control that is usually required, in particular an intrusive water level control, to recognise the excess definition. Not having such a level control reduces complexity, and also assists in reducing or minimising bacterial or other contamination by reducing undesired extra surface area within the second reservoir.

Secondly, by allowing overflow from the first reservoir 44 to fall into the second reservoirs 34, i.e. the excess of ultra-purified water provided by the water purification process 38 compared to the holding volume of the second reservoir 44, the ultra-purified water in the second reservoir 44 is not static. Static or stationary water of whatever quality, but obviously more acutely in relation to purified water, and most especially for ultra-purified water, deteriorates in quality over time, commonly by allowing the building up of contaminants such as bacteria to occur. The intermittent or possibly continuous influx of ultra-purified water stream 46 from the water purification process 38, causing the excess and hence overflow 56 during periods of non-use or non-take off of an outlet ultra-purified water stream 48, allows fresh water into the second reservoir 44, minimising the possibility of water in the second reservoir 44 being static, and thus minimises any deterioration in the water quality.

It is known to try and minimise the deterioration in quality of the water in a chamber or reservoir using devices such as composite vent filters 30. These contain filters to prevent microbial ingress and/or material such as soda lime to absorb carbon dioxide from the air passing into the reservoir when the water level in the reservoir drops, which would dissolve in the water raising its impurity levels. As the headspace above the linked first and second reservoirs is conjoined, then only one composite vent filter is required for both reservoirs. Alternatively sweeps of inert gases such as nitrogen or argon can be used, but these require additional plumbing and running costs.

Furthermore, the constant availability of ultra-purified water in the second reservoir 44 ensures a constant head in terms of pressure feed to an analyser, making mixing and controlling the outlet ultra-purified water stream 48 within an analyser less problematic. Larger reservoirs with greater water volumes tend to have more variable volume of water therein. This causes variability to the water feed pressure, and so to the internal arrangements within an analyser, which are otherwise intended to be very precise and controlled to provide the most precise measurements therefrom.

A yet further advantage is the direct possible connection of analyser feed line into the second reservoir 44, such as to provide the outlet ultra-purified water stream 48 as a direct connection and feed into an analyser. This can include the use of very inert capillary feed tubes to an analyser, to reduce or avoid any deterioration in the quality of the outlet ultra-pure water stream 48. The connection of such a feed tube could be achieved either by a direct interference fit with the second reservoir 44, or the use of a compression collet to hold the tube in place. This reduces additional fittings to a minimum, and hence further reduces the possibility of recontamination of the outlet ultra-purified water stream 48.

In FIG. 2, the feed water 35 can be provided from a pre-purification process and/or pre-purification unit 26a. The pre-purification process/unit 26a provides reduction and/or removal of contaminants and impurities in a water supply stream 28, such that the feed water 35 is a partially purified feed water. The water supply stream 28 may be a "mains" tap or the like, generally being a potable water source, and optionally pre-filtered or otherwise initially clean. The pre-purification process/unit 26a preferably includes one or more de-ionisers such as a reverse osmosis membrane. The pre-purification process/unit 26a may be distant from the water purification system of the present invention, such that it is part of a water purification and distribution system for the laboratory, suite of laboratories or building.

Optionally, the pre-purification process/unit 26a and the water purification system as shown in FIG. 2, are parts of a single water purification apparatus, optionally within a single housing, from which a user can be provided with an outlet purified water stream 36, and outlet ultra-purified water stream 48, thereby providing at least two outlet purified water streams of different guaranteed water quality from distinct outlets or parts of the overall water purification apparatus.

In particular, the present invention can be achieved by the simple conjoining or other application of the second reservoir 44 to an existing first reservoir 34 of a conventional water purification apparatus. That is, the second reservoir 44 can be retrofitted into an existing water purification method, system or apparatus.

A further advantage is that the overflow 56 of the ultra-purified water in the second reservoir 34 has an effect on the overall quality of the purified water 32 in the first reservoir 44, as well as causing turbulence to the first purified water, reducing its possible static or stationary time or nature, and thus reducing its possible contamination as discussed hereinabove.

Figure 3:
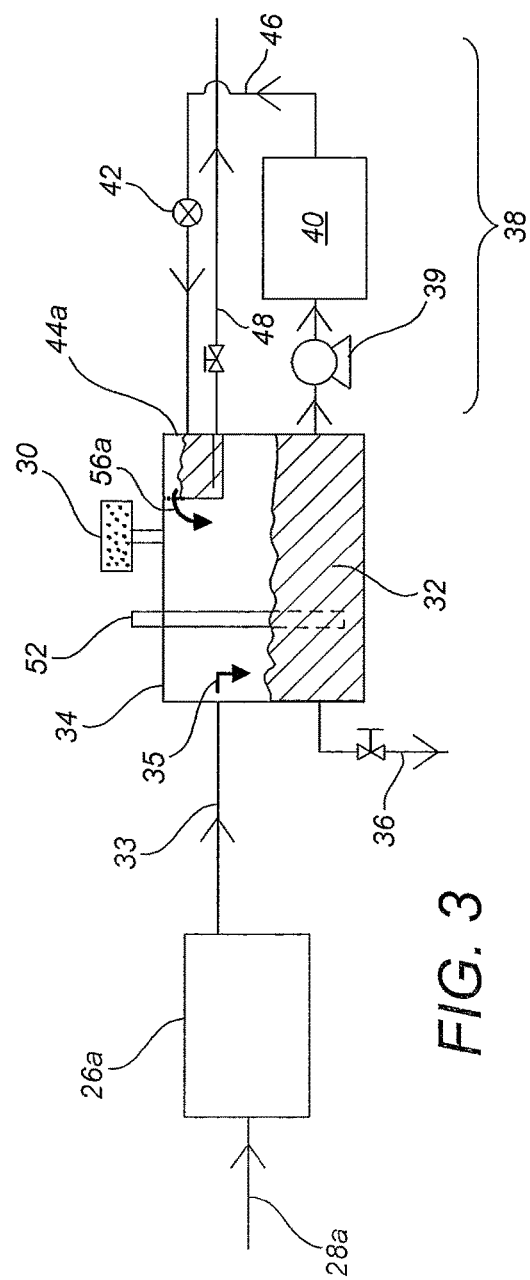
FIG. 3 is a schematic view of a method and system of providing at least two outlet purified water streams according to a second embodiment of the present invention.

FIG. 3 shows a second method of providing at least two outlet purified water streams from a water purification system, and a second water purification system, according to further embodiments of the present invention.

Most of the second method and the second water purification system shown in FIG. 3 are the same as that shown in FIG. 2. The major difference is the location of the second reservoir 44a within the first reservoir 34. In one arrangement, the second reservoir 44a is formed integrally with the first reservoir 34. In a second arrangement, the second reservoir 44a is formed separately, preferably from very high purity inert materials, and fitted to or with the first reservoir 34, optionally directly to one or more walls of the first reservoir 34 at a relatively high position. Alternatively the second reservoir 44a may be attached through the upper surface of the first reservoir 34 so that the second reservoir 44a hangs within the first reservoir 34.

Like FIG. 2, the water purification unit 38 in FIG. 3 provides the ultra-purified water stream 46 which passes into second reservoir 44a, and excess ultra-purified water in the second reservoir 44a becomes an overflow 56a into the first reservoir 34. The manner and possible mechanisms to allow the overflow 56a to flow or pass between the second reservoir 44a and first reservoir 34 may be the same or different to those discussed above in relation to the first method and first water purification system shown in FIG. 2.

The same advantages accrue to the arrangement shown in FIG. 3 as to that shown in FIG. 2.

Figure 4:
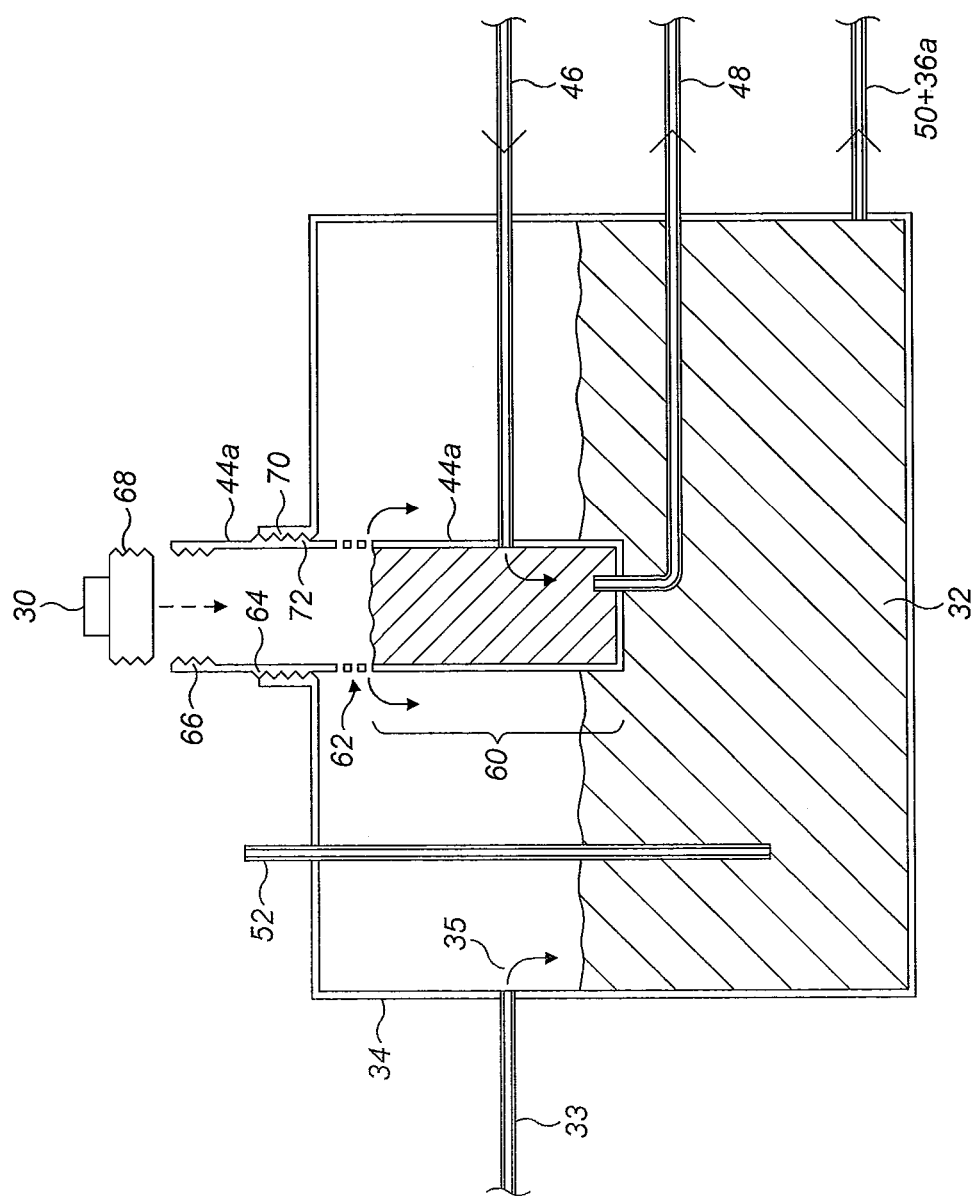
FIG. 4 is a cross-sectional view of another arrangement of first and second reservoirs for use in an embodiment of the present invention

FIG. 4 shows another arrangement for the first and second reservoirs 34, 44a previously discussed, wherein the second reservoir 44a is a cylindrical chamber having a lower portion 60. The lower portion 60 defines a pre-determined capacity or quantity of desired ultra-purified water to be held by the second reservoir 44a. Sequentially above the lower portion 60 is: a perforated wall portion 62, an outer threaded portion 64, followed by an internal threaded portion 66. Into the uppermost internal threaded portion 66 could be conveniently screwed a suitable vent filter 30 having a complementary external threaded portion 68. Using the external threaded portion 64, the second reservoir 44a can also be conveniently be screwed into a suitable port 70 of the first reservoir 34, which port 70 has a complementary internal threaded portion 72.

As described hereinbefore, a level sensor 52 extending into the first reservoir 34 provides the determination for a pre-determined capacity or quantity, i.e. a maximum volume, of purified water 32 in the first reservoir 34. The position of the perforated portion 62 of the second reservoir 44a provides a definition of the maximum volume of ultra-purified water in the second reservoir 44a, such that excess ultra-purified water provided along passageway 46 into the second reservoir 44a must then overflow through the holes or apertures of the perforated portion 62 and into the first reservoir 32 at a height which is above the maximum volume or capacity of the first reservoir 34.

Example

A unit based on the design of FIG. 3 herewith was operated for 6 months to feed an ion chromatography analyser requiring a flow of up to 300 ml/minute of water at intervals during its 20 minute cycle. The water was required at all times to have a purity, as indicated by its resistivity, of >10.0 MΩ·cm, Such water was drawn by the analyser from the unit for the uses of sample dilution, eluent make-up and rinsing of components during the cycle.

Purified water of a lower guaranteed purity was also required for general laboratory glassware washing and solution make up.

To provide both water streams, the unit was operated to take 'mains water' (i.e. as provided through a mains water system available in many countries) as a feed for a water supply stream (28a in FIG. 3) through a reverse osmosis membrane (26a) to provide a partially purified feed water (35) of conductivity 15 µS/cm at 120 ml/minute into the first reservoir (34). The first reservoir had a pre-determined maximum volume or capacity of 8 liters, defined and controlled by a level control (52).

Water from the first reservoir (34) was pumped at 500 ml/minute through purification process units (40) being ion exchange deionisation and oxidation by ultra-violet irradiation, to purify the water to a resistivity of 18.2 MΩ·cm as measured on the purity sensor (42). This ultra-purified water stream then entered the second reservoir (44a).

The second reservoir was a cylindrical chamber extending through a port in the upper surface of the first reservoir. A series of holes or apertures in the wall of the second reservoir allowed excess water beyond a pre-determined capacity of 250 ml to overflow back into the first reservoir. The holes were positioned above the maximum water level in the first reservoir.

An outlet from of the second reservoir was connected to the analyser allowing it to draw ultra-purified water from the second reservoir as required. A vent filter (30) was fitted to the top of the second reservoir (44a).

Two water outlets for supply of the first reservoir water were positioned (a) directly from the first reservoir (36), and (b) as an optional pressurised outlet located after the pump (39) in the recirculation line.

The present invention provides a water purification method and water purification system having at least two outlet purified water streams, one having a first water quality from a first reservoir that is more generally available for tasks requiring a level of purification of first level, and an ultra-purified water reservoir providing a second outlet stream of the highest possible purity, available for the very exacting requirements for specialise analysers and analytical techniques and processers. In particular, excess ultra-purified water is not allowed to be static or stationary whilst awaiting use, but overflows into the first reservoir so as to maintain the availability of the highest possible purity water from the second reservoir at all times.

The invention claimed is:

1. A method for producing ultra-purified water and for providing at least an outlet for a purified water stream and an outlet for an ultra-purified water stream from a water purification system comprising at least the steps of:
   (a) providing a first enclosed reservoir having a first inlet and an outlet;
   (b) providing a first purified feedwater into the first enclosed reservoir through the first inlet for providing a volume of purified water in the first reservoir, wherein the first purified feedwater is produced by passing a feedwater to a pre-purification unit to reduce or remove contaminants or impurities from the feedwater;
   (c) passing at least a first stream of the first volume of purified water from the first enclosed reservoir outlet through a water purification unit to reduce contaminants in the first purified water stream and for processing the first purified water stream to provide a first ultra-purified water stream;
   (d) providing a second enclosed reservoir connected to the first enclosed reservoir so as to share a common headspace, the common headspace comprising a volume of air above the water in the first enclosed reservoir and a volume of air above the water in the second enclosed reservoir and permitting passage of air between the first enclosed reservoir and the second enclosed reservoir, the second enclosed reservoir having a sidewall and a top, the second enclosed reservoir having a maximum internal volume for containing a volume of ultra-purified water below the top;
   (e) passing the first ultra-purified water stream to the second enclosed reservoir;
   (f) filling the second enclosed reservoir with the volume of ultra-purified water from the first ultra-purified water stream in excess of the second enclosed reservoir internal volume;
   (g) allowing the excess of the volume of ultra-purified water in the second enclosed reservoir to flow over or through the sidewall of the second enclosed reservoir and flow downward from the second enclosed reservoir into the first enclosed reservoir through the common headspace;

(h) supplying a second stream of purified water from the volume of purified water in the first enclosed reservoir to a first outlet from the water purification system for dispensing the second steam of purified water;

(i) supplying a second stream of ultra-purified water from the second enclosed reservoir to a second outlet from the water purification system for dispensing the second stream of ultra-purified water; and (j) removing carbon dioxide from air passing into the common headspace.

2. A method as claimed in claim 1 wherein the first enclosed reservoir is between 2 times to 10 times bigger than the second enclosed reservoir.

3. A method as claimed in claim 1 wherein the first ultra-purified water stream has a resistivity of >10MΩ·cm.

4. A method as claimed in claim 1 wherein the second outlet for the second stream of ultra-purified water is a purified analyser water stream.

5. A method as claimed in claim 1 wherein step (c) is continuous.

6. A method as claimed in claim 1 wherein the second enclosed reservoir is within the first enclosed reservoir.

7. A method as claimed in claim 1 wherein the second enclosed reservoir is adjacent the first enclosed reservoir.

8. A method as claimed in claim 1 wherein the overflow from the second enclosed reservoir passes over or through the sidewall of the second enclosed reservoir into the first enclosed reservoir at a height above a top of the first enclosed reservoir.

9. A method as claimed in claim 1 wherein the first purified water stream has conductivity of <50 µS/cm.

10. A method as claimed in claim 1 wherein the water purification process of step (c) includes oxidation of the first purified water.

11. A water purification system able to provide at least an outlet for a purified water stream and an outlet for an ultra-purified water stream comprising at least:

(a) a first enclosed reservoir having a volume for containing a purified feedwater, the first enclosed reservoir having a first water inlet for receiving the purified feedwater and an outlet to provide the purified water stream from the volume of the purified feedwater, wherein the purified feedwater is produced by passing a feedwater to a pre-purification unit to reduce or remove contaminants or impurities from the feedwater;

(b) a second enclosed reservoir, the second enclosed reservoir having a sidewall and a top;

(c) one or more connected water purification process units for processing the purified water stream from the outlet of the first enclosed reservoir to provide a first ultra-purified water stream to the second enclosed reservoir, wherein each of the one or more connected water purification process units reduce contaminants in the first purified water stream;

(d) the second enclosed reservoir having a maximum internal volume for containing for the ultra-purified water stream provided by step (c) below the top, and having an outlet for providing a second ultra-purified water stream from the system;

(e) the second enclosed reservoir sharing a headspace with the first enclosed reservoir, the headspace comprising a volume of air above the water in the first enclosed reservoir and a volume of air above the water in the second enclosed reservoir and defining a direct pathway from the second enclosed reservoir to the first enclosed reservoir to allow excess of the first ultra-purified water stream provided into the second enclosed reservoir beyond the second enclosed reservoir internal volume to flow over or through the sidewall of the second enclosed reservoir and flow downward from the second enclosed reservoir into the first enclosed reservoir;

(f) an outlet from the water purification system for dispensing a second stream of purified water from the volume of purified water in the first enclosed reservoir; and (g) a carbon dioxide remover for air passing into the common headspace.

12. A water purification system as claimed in claim 11 wherein the water purification unit includes one or more of the following group comprising: an oxidiser, activated carbon, a deioniser.

13. A water purification system as claimed in claim 11 wherein the first enclosed reservoir is bigger than the second enclosed reservoir.

14. A water purification system as claimed in claim 11 wherein the second enclosed reservoir is within the first enclosed reservoir.

15. A water purification system as claimed in claim 11 wherein the second enclosed reservoir is adjacent the first enclosed reservoir.

16. A water purification system as claimed in claim 11 wherein the direct pathway between the second enclosed reservoir and the first enclosed reservoir is a passageway over the sidewall or through the sidewall or both of the second enclosed reservoir.

17. A water purification system as claimed in claim 11 wherein the water purification unit operates continuously.

18. A water purification system as claimed in claim 11 wherein the ultra-purified water stream has a resistivity of >10MΩ·cm.

19. A water purification system as claimed in claim 11 wherein the maximum internal volume of the second enclosed reservoir is defined by the volume of a part of the second enclosed reservoir that is less than an entire volume of the second enclosed reservoir.

20. A water purification system as claimed in claim 19 wherein the second enclosed reservoir does not include a level sensor.

21. A method for producing ultra-purified water and for providing at least an outlet for a purified water stream and an outlet for an ultra-purified water stream from a water purification system comprising at least the steps of:

(a) providing a first enclosed reservoir having an inlet and an outlet;

(b) receiving a stream of purified feedwater into the first enclosed reservoir through the inlet for producing a volume of purified water in the first reservoir, wherein the stream of purified feedwater is produced by passing a feedwater to a pre-purification unit to reduce or remove contaminants or impurities from the feedwater;

(c) providing a first purified water stream from the volume of purified water in the first reservoir having a conductivity of <50 µS/cm from the outlet of the first enclosed reservoir;

(d) passing at least a portion of the first stream of purified water from the first enclosed reservoir through a water purification unit to reduce contaminants in the at least a portion of the first stream of purified water and for processing the first purified water stream to provide a first ultra-purified water stream;

(e) providing a second enclosed reservoir, the second enclosed reservoir having a sidewall, a top and a maximum internal volume for containing fluid below the top, and the second enclosed reservoir sharing a headspace with the first enclosed reservoir, the headspace comprising a volume of air above the water in the first enclosed reservoir and a volume of air above the water in the second enclosed reservoir and permitting passage of air between the first enclosed reservoir and the second enclosed reservoir;

(f) passing the first ultra-purified water stream to the second enclosed reservoir;

(g) filling the second enclosed reservoir with a volume of ultra-purified water from the first ultra-purified water stream in excess of the second enclosed reservoir internal;

(h) allowing the excess of the volume of ultra-purified water in the second enclosed reservoir to flow over or through the sidewall of the second enclosed reservoir and flow downward from the second enclosed reservoir into the first enclosed reservoir;

(i) supplying a second stream of ultra-purified water from the second enclosed reservoir to a second outlet from the water purification system for dispensing the second stream of ultra-purified water having a resistivity of >10 MΩ·cm;

(j) supplying a second stream of purified water from the volume of purified water in the first enclosed reservoir to a providing an first outlet from the water purification system of a for dispensing the second steam of purified water having a conductivity of <50 ΩS/cm; and (k) removing carbon dioxide from air passing into the headspace.

22. A method as claimed in claim 21 wherein the second enclosed reservoir is located proximate to or within the first enclosed reservoir so that the sidewall of the second enclosed reservoir forms a common wall with the first enclosed reservoir that separates the first enclosed reservoir and the second enclosed reservoirs, and wherein the step (h) involves allowing the excess ultra-purified water in the second enclosed reservoir to flow over or through the common wall.

23. A method as claimed in claim 21 wherein the second enclosed reservoir is located proximate to or within the first enclosed reservoir so that the sidewall of the second enclosed reservoir forms a portion of a wall that separates the first enclosed reservoir and the second enclosed reservoir, and wherein the step (h) involves allowing the excess ultra-purified water in the second enclosed reservoir to flow over or through the wall that separates the first enclosed reservoir and the second enclosed reservoir.

* * * * *